July 17, 1928.

J. B. WENZEL

PACKING RING

Filed July 1, 1922

1,677,158

INVENTOR
Jacob B. Wenzel,
BY
Everett H. Rook,
ATTORNEYS.

Patented July 17, 1928.

1,677,158

UNITED STATES PATENT OFFICE.

JACOB B. WENZEL, OF BLOOM, COLORADO, ASSIGNOR TO ALBERT W. WENZEL, OF NEWARK, NEW JERSEY.

PACKING RING.

Application filed July 1, 1922. Serial No. 572,251.

This invention relates to that class of packing rings which are commonly known as piston rings and used largely in gas engines for automobiles and the like, the objects of the invention being to secure an improved packing ring which will quickly wear in or seat itself against the surface toward which it expands, so as to form a seal, and which will supply oil to its quick-wearing portion more freely than it will subsequently to the surface produced by the wearing away of said portion; to provide for this purpose a ring having a peripheral quick-wearing portion and a peripheral groove, said groove having a wall which is abrupt to the surface of the ring which engages when the quick-wearing portion is worn away and said quick-wearing portion having a wall sloping inwardly toward said wall of the oil-groove to feed oil copiously to the quick-wearing portion; to secure such a ring by shallowly concaving its peripheral surface and forming in the the bottom of the concavity a groove whose sides are substantially perpendicular to said concavity; to obtain a ring having a sloping wall leading from an oil groove to a quick-wearing edge, which sloping wall wears away with the edge and leaves an abrupt wall for the permanent wearing surface of the ring; to thus secure a ring which is not only quickly effective but permanently effective, and to obtain other results and advantages as may be brought out by the following description.

Figure 1:
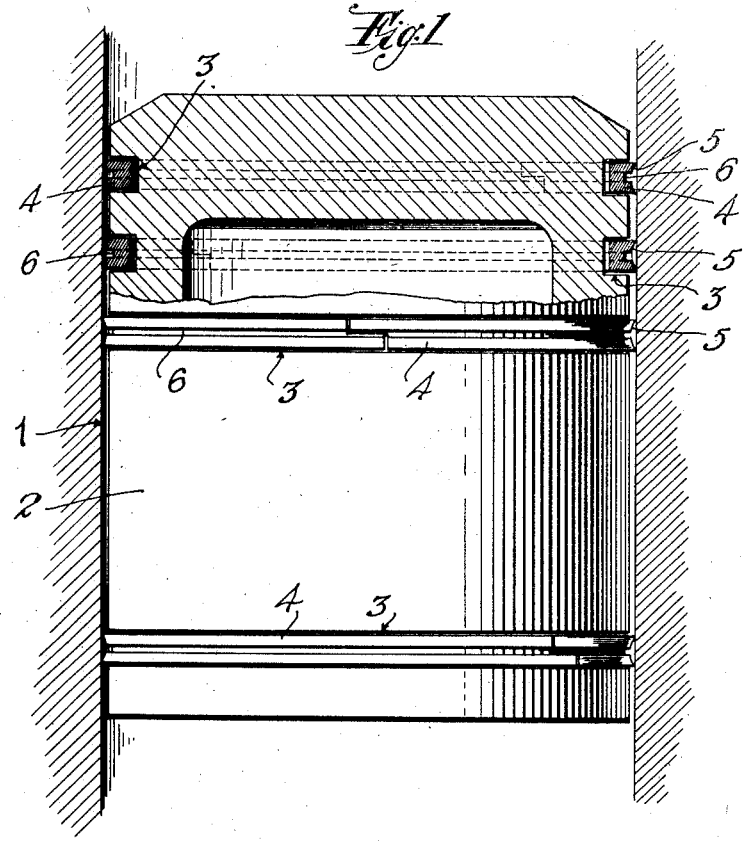
Figure 2:
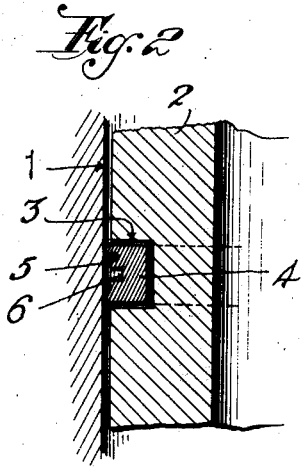
Figure 3:
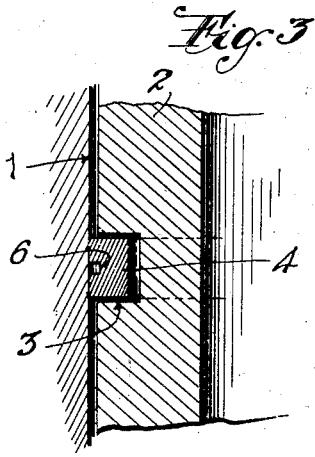

Referring to the accompanying drawings, in which like numerals of reference indicate the same parts throughout the several views, Figure 1 is a view of a piston equipped with rings of my improved construction, the piston and part of said rings being shown in section, as well as the cylinder wall;

Figure 2 is a cross-section of that portion of such a ring between the piston and cylinder wall on larger scale, as it is first inserted, and Figure 3 is a similar cross-section at a circumferential point of said ring which has worn down so that the concavity has disappeared.

In the specific embodiment of the invention shown in said drawings, 1 indicates the inner wall of a cylinder in which a piston 2 is adapted to reciprocate, said piston being provided with grooves 3 for piston rings 4. Obviously any number of these piston rings may be employed in any suitable and well-known arrangement, as may be desired. Aside from their peripheral surface, they may also be of any cross-sectional size or shape, although I have shown them as rectangular.

The outer peripheral surface of each piston ring 4 is concaved transversely, as at 5, the concavity preferably being slight and only that which is required to present projecting corner edges which will quickly wear down and seat the ring against the cylinder wall. This concavity is exaggerated for clearness in the drawing, as will be understood by those skilled in the art, such a concavity for wearing-in purposes being well-known. Such a concaved ring quickly wears into sealing relation to the cylinder wall, the corner edges wearing away more or less at different circumferential points, as is necessary to make the entire ring fit, and, while at some points there may be a central groove left for a considerable period, at other circumferential points the ring quickly wears flat so that there is no oil-retaining groove at all.

It is the purpose of the present invention to insure not only that the ring shall quickly wear in or seat itself, but that there shall always be an oil groove for the entire periphery of the ring, so as to secure better lubrication and greater imperviousness. For this purpose, I not only concave the ring transversely, as shown at 5 in the drawings, but I also form intermediate the thin edges of such a ring an oil groove 6 of sufficient depth to always be retained in the ring. This groove may be of any desired cross-sectional shape, but I have shown it rectangular for purposes of illustration. Even at those circumferential portions of the ring where the thin edge portions of its periphery wear away entirely, as shown in Figure 3, the oil groove 6 remains and serves its purpose, so that a packing ring is secured which not only quickly wears in or seats itself but which also always has an oil groove for its entire periphery.

The oil groove 6 is according to my invention and as shown in the drawings spaced from the quick-wearing edges of the concavity, by sloping portions of the wall of said concavity, so that a tapering passage leads from the oil groove 6 to each edge. The result is that when the ring is first put in, as shown in Figure 2 more especially, oil is very freely supplied to the thin quick-wearing edges, so as to prevent them from cutting or otherwise injuring the surface of the cylinder upon which they slide. As the edges wear down, the tapering passages between them and the oil groove 6 become more and more restricted, so that less oil passes, and when finally the quick-wearing edges are all worn away, as in Figure 3, the bearing surfaces of the ring terminate at the edges of the oil groove 6 and only such oil will be supplied to said bearing surfaces as can creep in onto the same. All this insures that when the quick-seating edges are sharpest and most likely to cut or damage the cylinder surface on which they slide the access of oil to them will be the freest, and as said edges wear down and broaden, so that they are less likely to cut or injure the cylinder wall, the access of oil to them is more and more restricted whereby it serves more and more as a seal and less and less as a lubricant.

In fact, the walls of the oil groove are abrupt to the surface of ring which engages when the quick-wearing portions are worn away, so as to form oil-wiping edges at their intersection with said surface, as I have illustrated by showing the side walls of the groove 6 perpendicular to the bottom of the concavity. However, they do not have to be perpendicular, but can be otherwise abrupt so as to form oil-wiping edges, and obviously other modifications of construction can be made without departing from the spirit and scope of my invention. Therefore I wish to be understood as not limiting myself except as required by the following claim when construed in the light of the prior art.

Having thus described the invention, what I claim is:

A piston ring which is peripherally and shallowly dished to produce outwardly sloping surfaces terminating in sharp outer edges at the top and bottom of the ring, there being a central groove in the base of the dish with side walls substantially perpendicular to said base, said groove ensuring in the ring when new large storage space from which oil is supplied freely to said sharp outer edges of the ring over the sloping surfaces and providing when the dish is worn away a reduced storage space from which oil is supplied to the substantially cylindrical surface over abrupt right-angular edges to a more restricted extent.

JACOB B. WENZEL.